United States Patent [19]

Villella et al.

[11] 3,711,728

[45] Jan. 16, 1973

[54] SOLID STATE DOUBLE-POLE DOUBLE-THROW RELAY

[76] Inventors: Felminio Villella, 351 Jack Coleman Drive, Huntsville, Ala. 35805; Leon C. Hamiter, 211 Homewood Drive, Huntsville, Ala. 35801

[22] Filed: Aug. 19, 1971

[21] Appl. No.: 173,183

[52] U.S. Cl. ....................307/254, 307/255, 307/311

[51] Int. Cl. .............................................H03k 17/60

[58] Field of Search.......................307/255, 254, 311

[56] References Cited

UNITED STATES PATENTS

| | | | |
|---|---|---|---|
| 3,238,386 | 3/1966 | Schaffner | 307/255 |
| 3,538,353 | 11/1970 | Hanger | 307/255 |
| 3,304,431 | 2/1967 | Baird et al. | 307/254 |
| 3,191,121 | 6/1965 | Nelson | 307/254 |
| 3,181,003 | 4/1965 | Sauber | 307/254 |

*Primary Examiner*—James W. Lawrence
*Assistant Examiner*—Harold A. Dixon
*Attorney*—L. D. Wofford, Jr. et al.

[57] ABSTRACT

A solid state DPDT relay circuit having two pairs of PNP transistors, one pair normally conductive so as to provide a closed current path to terminals connected to the collectors of its transistors and the other pair normally non-conductive so as to provide openings in current paths to terminals connected to the collectors of its transistors. The bases in each pair of PNP transistors are connected to one another, and the emitters of both pairs are connected to two interconnected terminals. The base pairs are connected to an NPN phototransistor of a photon-coupling pair, one base pair through the base-collector junction of an NPN transistor and the other through the base collector junctions of two other NPN transistors in series. Switching action is realized by actuation of a light-emitting diode coupled with the phototransistor to change the conductive state of the latter, which in turn changes the conductive states of both pairs of PNP transistors.

6 Claims, 3 Drawing Figures

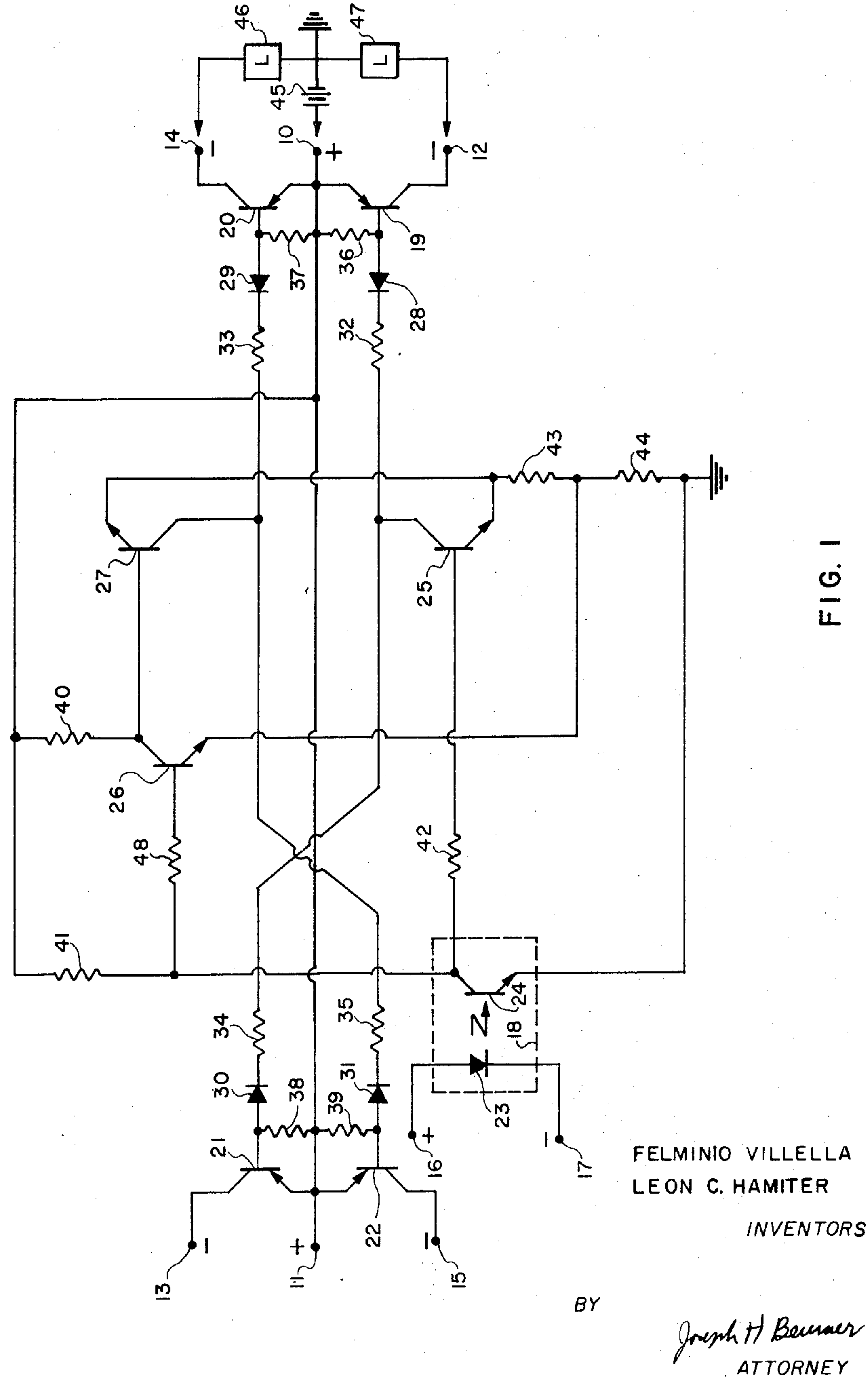
FIG. I
FELMINIO VILLELLA
LEON C. HAMITER
*INVENTORS*
BY
Joseph H Beumer
ATTORNEY

FELMINIO VILLELLA
LEON C. HAMITER
*INVENTORS*

*BY*

*ATTORNEY*

SOLID STATE DOUBLE-POLE DOUBLE-THROW RELAY

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

This invention relates to transistor switching circuits and more particularly to a solid state double-pole double-throw relay circuit.

Electromechanical relays possess certain inherent disadvantages for space applications where very high reliability and capability for service under extreme conditions are essential. The usual electromagnetic relay structure includes an electromagnet, springs and moving contacts operated by an armature. The various materials of construction, metals, plastics, wire insulation and solder or weld splash, provide sources of contamination which may result in a change in relay operating characteristics. Electromechanical relays are also sensitive to vibration and subject to change of contact resistance with time. In some applications a safety hazard is created by arcing between relay contacts. A solid-state electronic relay without any moving parts would avoid those disadvantages and provide better ruggedness and reliability.

SUMMARY OF THE INVENTION

In accordance with the present invention a solid state DPDT relay is provided. The relay circuit has two pairs of PNP transistors adapted to be switched off and on in a manner such that one pair is in the conductive state, providing closed current paths between terminals connected to its transistor collectors and other terminals connected to its emitters, while the other pair is non-conductive and no current can flow to terminals connected to its transistor collectors. Controlled switching action is obtained by means of NPN transistors, one having its collector connected to the bases of one pair of PNP transistors and two others connected in series through their base-collector junctions to the bases of the other pair of PNP transistors, and by an interruptable current path, preferably through the collector and emitter of an NPN transistor of a photon-coupling pair, between the NPN transistor bases and ground potential. Relays embodying the invention avoid the contamination and reliability problems associated with electromechanical devices. Higher speed operation is also realized and the possibility of internal arcing is eliminated. In addition, solid state devices of this invention exhibit a low contact voltage drop.

It is therefore an object of this invention to provide a solid state DPDT relay.

Another object is to provide a DPDT relay having a low contact voltage drop.

Still another object is to provide a DPDT relay characterized by a high degree of reliability and capability for service under extreme condition.

Other objects and advantages of the invention will be apparent from the following detailed description and the accompanying drawings.

BRIEF DESCRIPTION OF THE DRAWINGS

FIG. 1 shows an electronic circuit for a DPDT relay embodying the invention;

Referring to FIG. 1 of the drawings, the circuit includes terminals 10 and 11, connected to one another, and terminals 12, 13, 14 and 15 connected to collectors of transistors adapted to be switched off and on in a manner such that in one condition current paths are provided between terminals 10 and 12 and between terminals 11 and 13, and in another condition current paths are provided between terminals 10 and 14 and between terminals 11 and 15. Switching action of the circuit is controlled by application of current through positive terminal 16 and negative terminal 17 of a photon-coupling pair 18.

Figure 3:
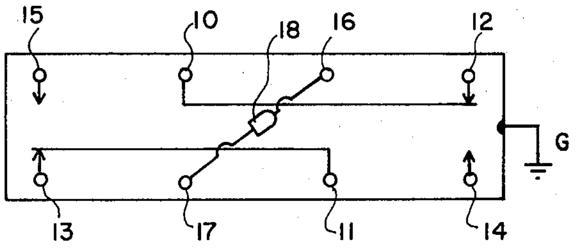
FIG. 3 is a diagram of the embodiment of FIG. 1 depicting the relay in terms of an electromechanical equivalent in order to facilitate an understanding of relay operation, the relay being shown in the unenergized position.

Terminal 10 is connected to the emitters of two PNP transistors 19 and 20, the collectors of transistors 19 and 20 being connected to terminals 12 and 14 respectively. Terminal 11 is similarly connected to the emitters of two PNP transistors 21 and 22, the collectors of transistors 21 and 22 being connected to terminals 13 and 15 respectively. Transistors 19 and 21 have their bases connected to one another and are adapted to operate as a pair, both members of which are either in the conductive or non-conductive state at any given time. Transistors 20 and 22 also have their bases connected and operate as a pair, both members of which are rendered conductive or non-conductive together. When transistors 19 and 21 of the first pair are in the conductive state, closed current paths are provided between terminals 10 and 12 and between terminals 11 and 13, and current paths between terminals 10 and 14 and 11 and 15, respectively, will be open inasmuch as transistors 20 and 22 of the second pair will be non-conductive. Conversely, when transistors 20 and 22 are in the conductive state, transistors 19 and 21 will be non-conductive.

Photon-coupling pair 18 includes a light emitting diode 23 and an NPN phototransistor 24, which becomes conductive upon application of current through terminals 16 and 17 from a suitable electrical power source (not shown). Phototransistor 24 has its emitter connected to ground and its collector connected to the bases of NPN transistors 25 and 26, with current-limiting resistors 42 and 48 being disposed in the current paths to the bases of transistors 25 and 26, respectively. NPN transistor 25 has its emitter connected to ground through resistors 43 and 44 and its collector connected to the first pair of PNP transistors 19 and 21. NPN transistor 26 has its emitter connected to ground through resistor 44 and its collector connected to the positive voltage supply at terminals 10 and 11 through resistor 40 and to the base of NPN transistor 27, which in turn has its emitter connected to ground through resistors 43 and 44 and its collector connected to the bases of PNP transistors 20 and 22. Diodes 28, 29, 30 and 31, disposed between the bases of PNP transistors 19, 20, 21, and 22, respectively, and the input connections thereto from the collectors of NPN transistors 25 and 27, serve as isolation means, preventing flow of current in the PNP transistors in reverse of the desired direction. Resistors 32, 33, 34 and 35 are disposed between diodes 28, 29, 30 and 31, respectively, and input connections from the collectors of NPN transistors 25 and 27 to provide the proper biasing base current for transistors 19, 20, 21 and 22. The circuit also includes resistors 36, 37, 38 and 39 connected to terminals 10 and 11 and to the bases of PNP transistors 19, 20, 21 and 22 respectively, and to the positive terminals of diodes 28, 29, 30 and 31, respectively, so as to provide a path from base to supply for collector-to-base leakage current of transistors 19, 20, 21 and 22. Resistor 40 connected to the collector of transistor 26 and positive voltage supply at terminals 10 and 11 provides the collector load for transistor 26 and limits the current to the base of transistor 27 from the positive voltage supply. Resistor 41 provides the collector load for phototransistor 24, and resistor 48 limits the current to the base of transistor 26 from the positive voltage supply.

The circuit is shown with terminal 10 adapted to be connected to the positive terminal of DC voltage supply 45, which has its negative terminal connected to one terminal of loads 46 and 47 in parallel and to ground. The other terminals of loads 46 and 47 are shown adapted to be connected to terminals 14 and 12, respectively.

In operation of the circuit, when no current flows across diode 23 through terminals 16 and 17, phototransistor 24 is non-conductive, so that the current path from the base of NPN transistor 25 to ground is open and transistor 25 conducts. Under these conditions NPN transistor 25 supplies through its collector forward biasing current for PNP transistors 19 and 21, rendering the latter transistors conductive. Closed current paths are thereby provided between terminal 10 and terminal 12 and between terminal 11 and terminal 13. Since the path to ground from the base of transistor 26 through phototransistor 25 is open, transistor 26 also conducts, pulling the base of NPN transistor 27 toward ground and rendering transistor 27 non-conductive. Transistor 27 being off, no base current is supplied to PNP transistors 20 and 22 so that the latter are non-conductive and current paths between terminals 10 and 14 and between terminals 11 and 15 are open.

When a suitable voltage from a DC source (not shown) is applied through terminals 16 and 17, current flows across diode 23 in the photon coupling pair and it emits light, rendering phototransistor 24 conductive. The base of NPN transistor 25 is thereby pulled toward ground, turning transistor 25 off. PNP transistors 19 and 21, which draw base current from the collector of transistor 25 are also turned off, opening the current paths between terminals 10 and 12 and between 11 and 13. NPN transistor 26 is turned off since its base is also pulled toward ground, while NPN transistor 27 is turned on as a result of its base, which is connected to a positive voltage at terminals 10 and 11, becoming more positive with respect to its emitter. NPN transistor 27 being turned on, PNP transistors 20 and 22 will also be turned on inasmuch as they draw base current from the collector of transistor 27. Upon cessation of current flow through diode 23, all transistors revert to their original state of conduction, transistors 19 and 21 becoming conductive and transistors 20 and 22 non-conductive.

Control of the circuit is thus effected by opening and closing the common current path leading from the bases of NPN transistors 25 and 26 to ground. In the embodiment shown this switching function is performed by a photon-coupling pair, with the base-collector and base-emitter junctions of the phototransistor therein forming a part of the current path to ground. Other means such as other types of transistors or switches can be used for this purpose. However, use of the photon-coupling pair is preferred inasmuch as it provides complete electrical isolation of the actuating control components and the input thereto through terminals 16 and 17 from the remainder of the circuit.

Figure 2:
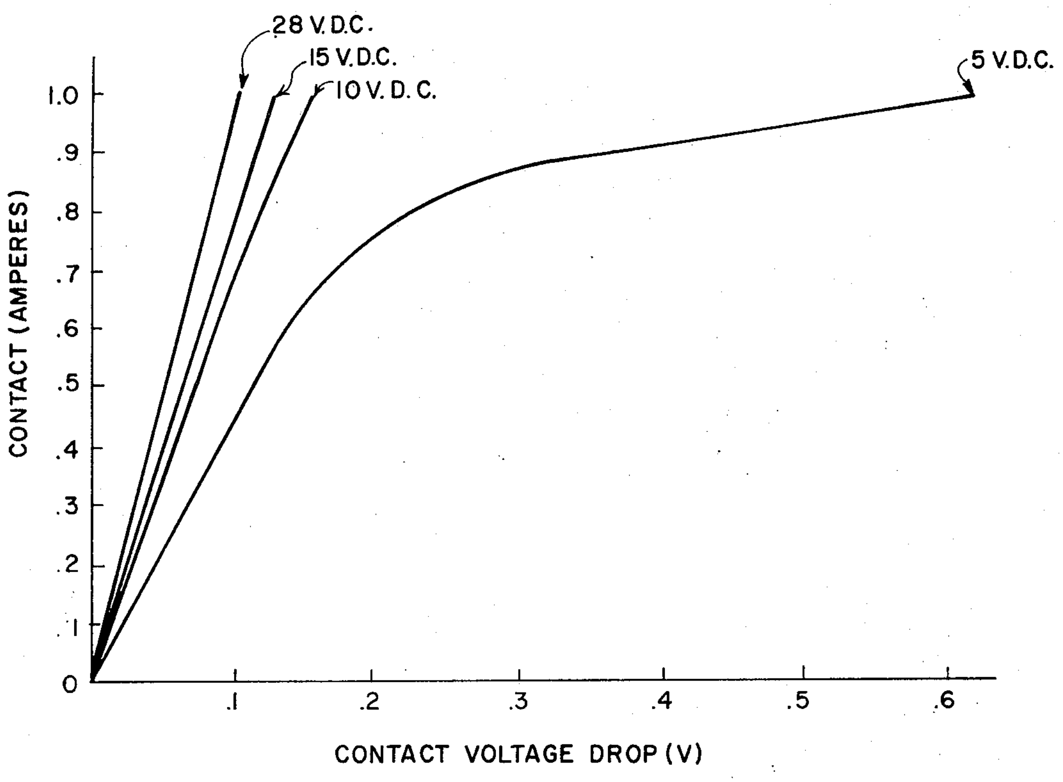
FIG. 2 is a graph showing contact voltage drop values under varying loads for a particular embodiment.

FIG. 2 of the drawings shows contact voltage drop values measured across the relay circuit depicted in FIG. 1 under varying loads for supply voltages from +5 to +28 volts. These values were obtained for a circuit utilizing the following components: PNP transistors 19, 20, 21 and 22, 2N3720; NPN transistors 25, 26 and 27, 2N2222; diodes 28, 29, 30 and 31, 1N5061; resistors 32, 33, 34 and 35, 400 ohms; resistors 36, 37, 38 and 39, 20K; resistor 43, 25 ohms; resistor 44, 25 ohms; resistor 42, 1.2K; resistor 40, 2.7K; resistor 48, 15K; resistor 41, 1K; and photon-coupling pair 18, TIXL103. It may be seen that contact voltage drop values are low for supply voltages of 10 volts and above, and less than 0.1 volt for a 28 volt system. Previously used relay circuits generally show voltage drops higher by a factor of at least 10.

The circuit describes above is amenable to fabrication and assembly by conventional techniques, and hybrid construction using semiconductor chips, transistor chips and thick film resistors can be employed. Integrated circuit structures can also be used.

Although a particular embodiment of the invention has been described above, it is to be understood that various changes and modifications can be made in the circuit arrangement and instrumentalities employed without departing from the spirit and scope of the invention.

We claim:

1. A solid state double-pole double-throw relay circuit comprising:

an input photon-coupled isolator having a light source and a photon-responsive element with positive and negative sides and adapted to undergo a change in its conductive state upon application of current to said light source;

first and second input NPN transistors each one thereof having its base coupled to the positive side of said photon-responsive element and adapted to undergo a change in conductive state in response to a change in conductive state of said element;

a third input NPN transistor having its base coupled to the collector output of said first input NPN transistor and adapted to undergo a change in conductive state in response to a change in conductive state of first input NPN transistor;

first and second pairs of output PNP transistors having their emitters coupled together and the bases in each pair coupled to one another;

the bases of one of said pairs of output PNP transistors being coupled to the collector of said second input NPN transistor and the bases of the other of said pairs of output PNP transistors being coupled to the collector of said third input NPN transistor;

each of said pairs of output PNP transistors being adapted to undergo a change of conductive state in response to the change of state of the input NPN transistor coupled thereto;

whereby the collectors and emitters of each of said pairs of output PNP transistors may be used as relay contacts, one pair of contacts being normally open and the other pair being normally closed.

2. The relay circuit defined in claim 1 including two pairs of isolation diodes, one pair of each thereof being intercoupled between the bases of one of said pairs of output PNP transistors in back-to-back relation.

3. The relay circuit defined in claim 2 wherein said input photon-coupled isolator comprises a light-emitting diode coupled with an NPN phototransistor.

4. The relay circuit defined in claim 3 including a single bus positive power line coupled to the emitters of each of said output PNP transistors and serving as the power source for biasing said input NPN transistors.

5. The relay circuit defined in claim 4 including a divider network coupling the emitters of each of said input NPN transistors to ground, the emitter of said first NPN being coupled through a first resistor and the emitters of said second and third NPN transistors being coupled through said first resistor and through a second resistor.

6. The relay circuit defined in claim 5 including means coupling the emitter of said NPN phototransistor to ground.

* * * * *